United States Patent
Ma et al.

(10) Patent No.: US 12,450,955 B2
(45) Date of Patent: Oct. 21, 2025

(54) METHOD FOR PROMPTING VEHICLE WADING, CONTROL DEVICE, STORAGE MEDIUM AND VEHICLE

(71) Applicant: Great Wall Motor Company Limited, Hebei (CN)

(72) Inventors: Longxing Ma, Hebei (CN); Fan Yang, Hebei (CN)

(73) Assignee: Great Wall Motor Company Limited, Hebei (CN)

( * ) Notice: Subject to any disclaimer, the term of this patent is extended or adjusted under 35 U.S.C. 154(b) by 94 days.

(21) Appl. No.: 18/682,920

(22) PCT Filed: Jun. 27, 2022

(86) PCT No.: PCT/CN2022/101556
§ 371 (c)(1),
(2) Date: Feb. 11, 2024

(87) PCT Pub. No.: WO2023/016108
PCT Pub. Date: Feb. 16, 2023

(65) Prior Publication Data
US 2024/0371211 A1      Nov. 7, 2024

(30) Foreign Application Priority Data
Aug. 11, 2021    (CN) .......................... 202110920819.X (51) Int. Cl.
G07C 5/00      (2006.01)
B60W 30/06     (2006.01)
G08B 21/24     (2006.01)

(52) U.S. Cl.
CPC .............. *G07C 5/008* (2013.01); *B60W 30/06* (2013.01); *B60W 2556/45* (2020.02); *G08B 21/24* (2013.01)

(58) Field of Classification Search
CPC ... G07C 5/008; B60W 30/06; B60W 2556/45; G01S 2013/9322
See application file for complete search history.

(56) References Cited

U.S. PATENT DOCUMENTS 9,302,586 B2 *   4/2016   Tran ................. B60G 17/01908
9,597,961 B2 *   3/2017   Tran ..................... B60G 17/019
(Continued)

FOREIGN PATENT DOCUMENTS

CN     102795183 A    8/2012
CN     102923071 A    2/2013
(Continued)

OTHER PUBLICATIONS

Machine Translation of Sui's reference (CN-112164206-A) (Year: 2021).*

(Continued)

*Primary Examiner* — Tarek Elarabi
(74) *Attorney, Agent, or Firm* — Renner, Otto, Boisselle & Sklar, LLP (57) ABSTRACT

A method for prompting vehicle wading, a control device, a storage medium and a vehicle. The current wading information of the vehicle is obtained, the wading information includes a wading depth, a preset wading level corresponding to the wading depth and a current maximum allowable wading depth of the vehicle; the current state of the vehicle is obtained, the current state of the vehicle includes a flameout parking state and a driving state; the current wading information of the vehicle is sent to the terminal device of the user if the current state of the vehicle is the flameout parking state; the current wading information of the vehicle is displayed on a display screen of the vehicle if the current state of the vehicle is the driving state.

14 Claims, 4 Drawing Sheets

(56) References Cited

U.S. PATENT DOCUMENTS

| | | | | |
|---|---|---|---|---|
| 2014/0085066 A1* | 3/2014 | Tran | ........................ | G01F 23/28 |
| | | | | 340/425.5 |
| 2014/0347178 A1* | 11/2014 | Tran | ....................... | G10K 13/00 |
| | | | | 340/438 |
| 2017/0176592 A1* | 6/2017 | Hoare | ................... | B60W 50/14 |

FOREIGN PATENT DOCUMENTS

| | | | | | |
|---|---|---|---|---|---|
| CN | 104243525 | A | | 12/2014 | |
| CN | 110254353 | A | | 7/2019 | |
| CN | 112164206 | A | * | 1/2021 | ........... G08B 21/182 |
| CN | 112677898 | A | | 4/2021 | |
| CN | 112815907 | A | | 5/2021 | |
| CN | 114643951 | A | | 6/2022 | |
| DE | 102018212785 | A1 | | 2/2020 | |

OTHER PUBLICATIONS

International Search Report for corresponding Application No. PCT/CN2022/101556, issued Aug. 30, 2022, with English translation.

Written Opinion for corresponding Application No. PCT/CN2022/101556, issued Aug. 30, 2022, translation not provided.

\* cited by examiner

METHOD FOR PROMPTING VEHICLE WADING, CONTROL DEVICE, STORAGE MEDIUM AND VEHICLE

CROSS-REFERENCE TO RELATED APPLICATIONS

This application is a 35 U.S.C. § 371 national stage application of PCT patent application Serial No. PCT/CN2022/101556, filed on Jun. 27, 2022, which claims priority to Chinese patent application No. CN202110920819.X filed on Aug. 11, 2021, the entire contents of which are incorporated herein by reference.

TECHNICAL FIELD

The present application relates to the field of vehicle technologies, and more particularly, to a method for prompting vehicle wading, an apparatus for prompting vehicle wading, a control device, a storage medium, and a vehicle.

BACKGROUND

In rainy seasons, the urban drainage system crashes frequently in a peak period of rainfall, and waterlogging is more serious at some urban road bridges. If a vehicle is parked in this area, a driver may not accurately know about dangerous information of the vehicle in real time.

As an alternative, in a driving process of the vehicle, when a wade condition with a certain depth is encountered, due to insufficient driving experience of the driver, the driver may not determine a front water depth in a visual inspection manner due to insufficient driving experience of the driver. Thus, a risk may not be accurately predetermined in a driving process, and a vehicle wading is caused.

How to enable a user to obtain a wading state of a vehicle in time is a problem that needs to be solved urgently in the related art.

SUMMARY

The present application provides a method for prompting wade, a control device, a storage medium and a vehicle, which may notify a user with the current wading condition of the vehicle in time, thereby solving a technical problem that a wading condition of the vehicle cannot be obtained in time.

In accordance with the first aspect, a method for prompting vehicle wading is provided in the embodiments of the present application, the method includes:
  obtaining current wading information of a vehicle, the wading information includes a wading depth, a preset wading level corresponding to the wading depth, and a current maximum allowable wading depth of the vehicle;
  obtaining a current state of the vehicle, wherein the current state of the vehicle includes a flameout parking state and a driving state;
  sending the current wading information of the vehicle to a terminal device of a user if the current state of the vehicle is the flameout parking state;
  displaying the current wading information of the vehicle on a display screen of the vehicle if the current state of the vehicle is the driving state.

In one possible implementation, if the current state of the vehicle is the flameout parking state, the method further includes:
  sending first prompt information to the terminal device of the user if the wading depth is greater than or equal to a first preset depth, wherein the first prompt information is used to prompt the user that the vehicle is in a dangerous state, and the first prompt information includes trailer suggestion information.

In one possible implementation, if the current state of the vehicle is the flameout parking state, the method further includes:
  sending second prompt information to the terminal device of the user if the wading depth is greater than or equal to a second preset depth and is less than a first preset depth; the second prompt information is used for prompting the user to perform a vehicle moving operation, the second prompt information is also used for requesting the user to indicate whether an automatic parking needs to be performed;
  receiving an indication message sent by the user according to the second prompt information, and determining whether the automatic parking is performed according to the indication message.

In one possible implementation, if the current state of the vehicle is the flameout parking state, the method further includes:
  sending, if a radar cannot operate normally, third prompt information indicative of limited radar function to the terminal device of the user, in order that the user detects the radar according to the third prompt information.

In one possible implementation, if the current state of the vehicle is the driving state, the method further includes:
  obtaining current gradient information of the vehicle;
  displaying the current wading information of the vehicle and the current gradient information of the vehicle on the display screen of the vehicle, and performing a wading prompt through the display screen, the wading prompt corresponds to a preset wading level and the preset wading level corresponds to the wading depth.

In one possible implementation, if the current state of the vehicle is the driving state, the method further includes:
  determining whether a preset trigger condition is met, the preset trigger condition includes: the radar is in a normal operating state, the wading depth of the vehicle is greater than or equal to a first preset depth, a wading mode of the vehicle is in a closed state, and the preset identifier is in an inactive state;
  sending a query message to the user if the preset trigger condition is met, the query message is used for inquiring the user about whether the wading mode needs to be opened.

In one possible implementation, the method further includes:
  displaying the query message on the display screen of the vehicle, and triggering a timer to be started, and switching the timer from an inactive state to an activated state;
  sending a wade switch request indicating that a wade switch is in an open state if a response for opening the wading mode is received within a first preset time period, the preset identifier is maintained at the inactive state; or
  closing the query message, switching the preset identifier from the inactive state to the activated state, and switching the timer from an activated state to an inactive state, if a response to the query message is not obtained from the user within the first preset time period, or if a response indicating that the wading mode is not opened is obtained from the user within the first preset time period.

In one possible implementation, if the current state of the vehicle is the flameout parking state, the method further includes:

monitoring a voltage of the vehicle, and turning off the radar if the voltage of the vehicle is less than or equal to a preset voltage;

and/or, controlling the radar to enter an operating state from a sleep state every second preset time period, maintaining the operating state of the radar for the third preset time period, and then uploading measurement data to a cloud device and entering the sleep state again, wherein the radar switches between the sleep state and the operating state according to a preset period; or receiving a wake-up instruction for waking up the radio from the cloud device, in order to enable the radar to enter the operating state from the sleep state, or receiving a wake-up instruction for waking up the radar from the terminal device of the user, in order to enable the radar to enter the operating state from the sleep state.

In accordance with the second aspect, an apparatus for prompting vehicle wading is provided in the embodiments of the present application, the apparatus for prompting vehicle wading includes a vehicle wading information acquisition unit, a vehicle state acquisition unit and a prompting unit;

the vehicle wading information acquisition unit is configured to obtain current wading information of a vehicle, the wading information includes a wading depth, a preset wading level corresponding to the wading depth, and a current maximum allowable wading depth of the vehicle;

the vehicle state acquisition unit is configured to obtain a current state of the vehicle, wherein the current state of the vehicle includes a flameout parking state and a driving state;

the prompting unit is configured to: send the current wading information of the vehicle to a terminal of a user if the current state of the vehicle is the flameout parking state; display the current wading information of the vehicle on a display panel of the vehicle if the current state of the vehicle is the driving state.

In accordance with the third aspect, a control device is provided in the embodiments of the present application. The control device includes a memory, a processor and a computer program stored in the memory and executable by the processor. The processor is configured to, when executing the computer program, implement steps of the method according to the first aspect or according to any possible implementation in the first aspect.

In accordance with the fourth aspect, a non-transitory computer-readable storage medium is provided in the embodiments of the present application. The non-transitory computer-readable storage medium stores a computer program, when the computer program is executed by a processor, steps of the method according to the first aspect or according to any possible implementation in the first aspect are implemented.

In accordance with the fifth aspect, a vehicle is provided in the embodiments of the present application. The vehicle includes the control device described according to the third aspect.

Embodiments of the present application provide a method and an apparatus for prompting vehicle wading, a control device, a storage medium and a vehicle. The current wading information of the vehicle is obtained, the wading information includes a wading depth, a preset wading level corresponding to the wading depth and the current maximum allowable wading depth of the vehicle; the current state of the vehicle is obtained, wherein the current state of the vehicle includes the flameout parking state and the driving state. If the current state of the vehicle is the flameout parking state, the current wading information of the vehicle is sent to the terminal device of the user. If the current state of the vehicle is the driving state, the current wading information of the vehicle is displayed on the display screen of the vehicle. In this way, the user can obtain the wading state of the vehicle in time in any case.

DESCRIPTION OF THE DRAWINGS

In order to explain the technical solution in the embodiments of the present application, a brief introduction regarding the accompanying drawings that need to be used for describing the embodiments or the prior art is given below. It is obvious that the accompanying drawings described below are only some embodiments of the present application, for those skilled in the art, other drawings may also be obtained according to the current drawings without paying creative efforts.

DETAILED DESCRIPTION OF EMBODIMENTS

In the following descriptions, in order to describe but not intended to limit the present application, concrete details including specific system structure and technique are proposed to facilitate a comprehensive understanding of the embodiments of the present application. However, a person of ordinary skill in the art should understand that, the present application can also be implemented in some other embodiments from which these concrete details are excluded. In other conditions, detailed explanations of method, circuit, device and system well known to the public are omitted, so that unnecessary details which disturb the description of the present application can be avoided.

In order to make the objective, the technical solutions and the beneficial effects of the present application be clearer, the present application will be described below according to the embodiments with reference to the accompanying figures.

Figure 1:
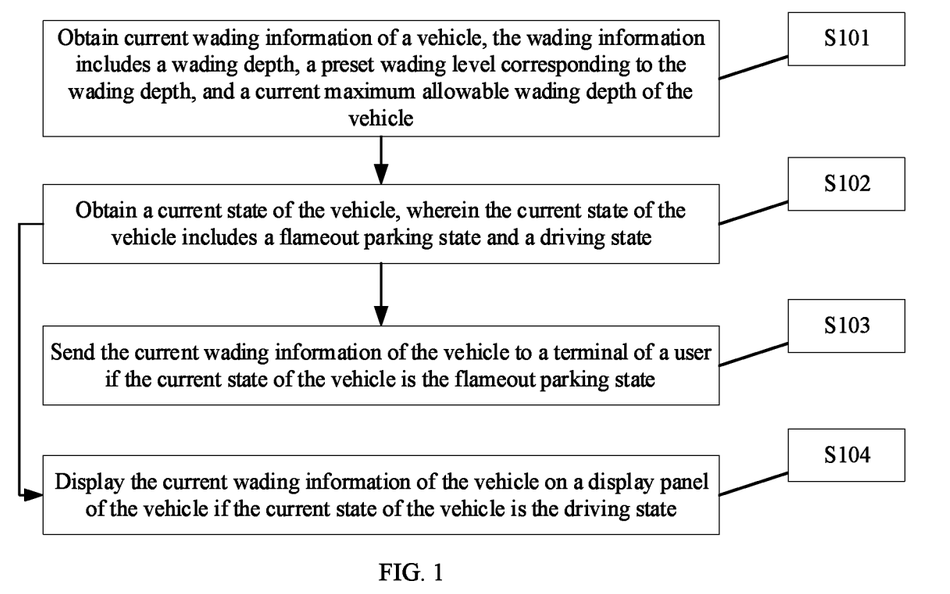
FIG. 1 is a flowchart illustrating an implementation of a method for prompting vehicle wading according to the embodiments of the present application.

Referring to FIG. 1, FIG. 1 is a flowchart illustrating an implementation of a method for prompting vehicle wading according to one embodiment of the present application.

In a step of S101, current wading information of the vehicle is obtained. The wading information includes a wading depth, a preset wading level corresponding to the wading depth, and a current maximum allowable wading depth of the vehicle.

Figure 2:
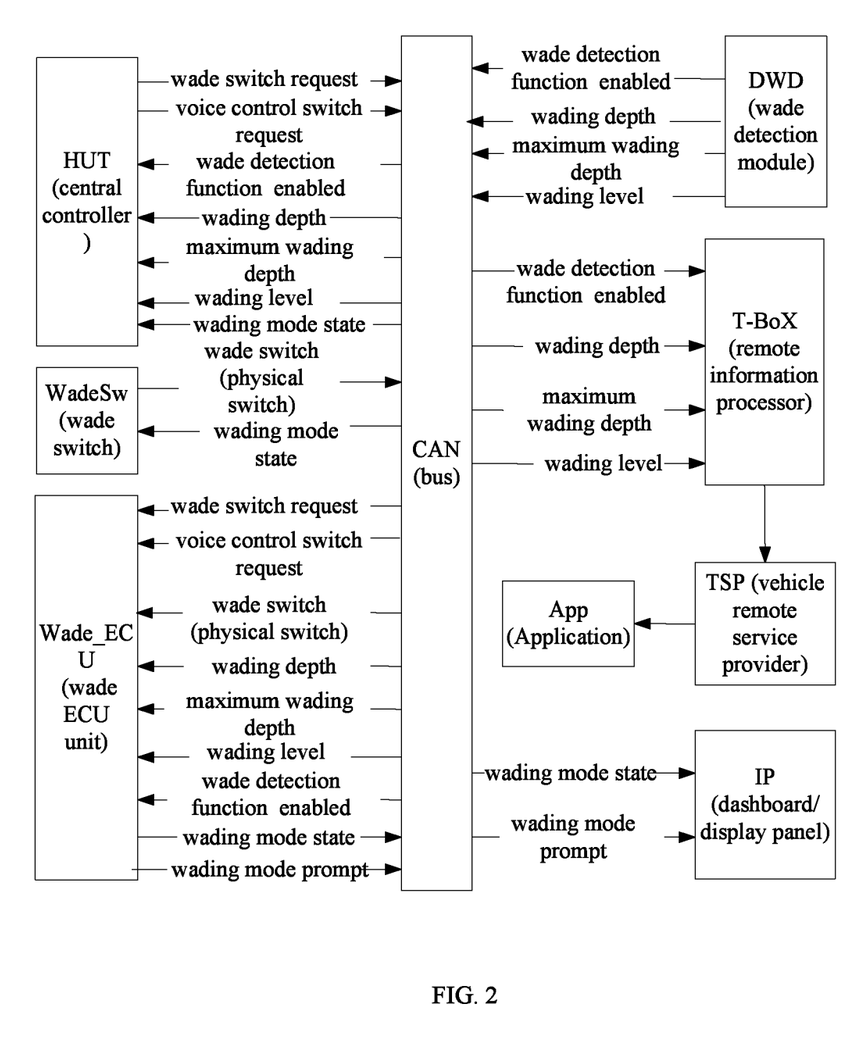
FIG. 2 is a schematic diagram of a vehicle control system according to the embodiment of the present application.

In one possible implementation, this embodiment of the present application is applied to a vehicle control system as shown in FIG. 2, description of signals of various modules in the vehicle control system is shown in a table listed below.

It should be noted that the vehicle control system for prompting vehicle wading shown in FIG. 2 is merely an example of a vehicle control system in this embodiment of the present application, and some of signal interaction processes in this embodiment of the present application is shown. Any control system used for implementing the embodiments of the method for prompting wading in the present application is within the protection scope of the present application.

| Signals | Value | Transmitting End | Receiving End | Explanation of Signals |
|---|---|---|---|---|
| WadeDetFunEna | 0x0: Disable<br>0x1: Enable/normal<br>0x2: Failure/Fault<br>0x3: Speed exceed 10 km/h<br>0x4: Controller pedal undeploy<br>0x5: gradient exceed 10°<br>0x6: Driving mode is snow, mud, sand<br>0x7: Parking System is open<br>0x8: Out rearview mirror undeploy<br>0x9: Doors are open<br>0xA: Reserve | DWD (Wade Monitoring Module) | T-box (Telematics Box), HUT (Head Unit), Wade-ECU (Wade Electronic Controller Unit) | Wade Detection Function Enabled |
| WadeDepth | 0x00-0x64: Valid values (valid values, calibration is needed) | | T-box, HUT, Wade-ECU | Wading depth |
| Max Wade Dep | 0x00-0x64: Valid values (valid values, calibration is needed) | | HUT, T-box, Wade-ECU | Maximum Wading depth |
| WadeDep Lvl | 0x0: normal<br>0x1: level 1<br>0x2: level 2<br>0x3: level 3<br>0x4: alarm | | HUT, T-box, Wade-ECU | Wading level |
| WadeSwReq_HUT (soft switching) | 0x0: No Request<br>0x1: No request | | Wade_ECU | Wade Switch Request |
| WadeSwReq_VR Voice Control Switch Request | 0x0: No action<br>0x1: No request<br>0x2: Request<br>0x3: Reserved | HUT | Wade_ECU | Voice Control Switch |
| WadeSwt Req | 0x0: No request<br>0x1: Request | WadeSW (Wade Switch) | Wade_ECU | Physical Switch |
| WadeModeSts | 0x0: Off<br>0x1: Standby<br>0x2: Basic mode<br>0x3: Professional mode<br>0x4: Failed<br>0x5-0x7: Reserved | Wade_ECU | HUT, WadeSw, IP (dashboard, display panel) | Wading mode States |
| WadeMode_Warn | 0x0: No warn<br>0x1: Please pay attention to the surrounding conditions, ignition caution<br>0x2: Please slow down<br>0x3: Please switch 4L mode<br>0x4: Please try to tap the brake pedal, test the braking performance<br>0x5-0x7: Reserved | | IP | Wading mode Prompt |
| LA_So | 0x0: 0<br>0x1: 0.061<br>0x2: 0.122<br>0x3: 0.244<br>0x4: 0.488 | HUT | DWD | Gyroscope Acceleration Speed |
| G_So | 0x0: 0<br>0x1: 4.37<br>0x2: 8.75<br>0x3: 17.5 | HUT | DWD | Gyroscope Acceleration Speed |

-continued

| Signals | Value | Transmitting End | Receiving End | Explanation of Signals |
|---|---|---|---|---|
| | 0x4: 35.0 | | | |
| | 0x5: 70.0 | | | |
| | 0x6: 140.0 | | | |

The current wading depth of the vehicle, the preset wading level corresponding to the wading depth and the current maximum allowable wading depth of the vehicle can be obtained through the wade detection module.

In a step of S102, the current state of the vehicle is obtained, wherein the current state of the vehicle includes a flameout parking state and a driving state.

In a step of S103, the current wading information of the vehicle is sent to a terminal device of the user if the current state of the vehicle is the flameout parking state.

The current state of the vehicle is the flameout parking state.

In one possible implementation, the first prompt information is sent to the terminal device of the user if the wading depth is greater than or equal to a first preset depth, the first prompt information is used to prompt the user that the vehicle is in a dangerous state, and the first prompt information includes trailer suggestion information.

In another possible implementation, if the wading depth is greater than or equal to a second preset depth and less than the first preset depth, second prompt information is sent to the terminal device of the user. The second prompt information is used to prompt the user to perform a vehicle moving operation. The second prompt information is also used for requesting the user to indicate whether to perform automatic parking. An indication message sent by the user according to the second prompt information is received, and whether to perform the automatic parking is determined according to the indication message.

Optionally, the user downloads a corresponding application (Application, APP) in a corresponding terminal device, (e.g., a mobile phone, a computer, etc.). Whether the user opens the APP to view the current wading state of the vehicle is determined, if the user does not open the APP to view the current wading state of the vehicle, prompting is not performed; if the user opens the APP to view the current wading state of the vehicle, the current wading information of the vehicle is sent to the terminal device of the user, and the corresponding information is displayed through the APP of the terminal device.

According to the current wading depth of the vehicle, if the wading depth is greater than or equal to the first preset depth, for example, the first preset depth is 300 mm, the first prompt information is sent to the user, in order to prompt the user that the vehicle is in a dangerous state and the first prompt information includes trailer suggestion.

If the wading depth is greater than or equal to the second preset depth (e.g., the second preset depth is 200 mm) and is less than the first preset depth, the second prompt information is sent to the terminal device of the user, in order to prompt the user to perform the vehicle moving operation and request the user to indicate whether to perform the automatic parking. An indication message sent by the user through the terminal device is received, and whether the automatic parking is activated is determined according to the indication message. The indication message from the user is used to indicate that the automatic parking is activated. Then, the automatic parking is activated, and the vehicle is stopped at a secure position.

If the current wading depth of the vehicle is less than the second preset depth, a prompt operation does not occur.

Optionally, in the form of the Internet of vehicles, in addition to the APP, the corresponding prompt information may also be sent to the user in a form of short message, WeChat, etc.

It should be noted that, the value of the first preset depth and the value of the second preset depth may be set according to the actual situation. The values of the first preset depth and the second preset depth are not limited in the embodiments of the present application.

Optionally, the method further includes: if a radar of the vehicle cannot operate normally, third prompt information with limited radar function is sent to the terminal device of the user, in order that the user detects the radar according to the third prompt information.

In a step of S104, if the current state of the vehicle is the driving state, the current wading information of the vehicle is displayed on a display screen of the vehicle.

If the current state of the vehicle is the driving state, the method further includes: the current gradient information of the vehicle is obtained; the current wading information and the current gradient information of the vehicle are displayed on the display screen of the vehicle, and wading prompt is performed through the display screen. The wading prompt corresponds to the preset wading level, and the preset wading level corresponds to the wading depth.

Optionally, after the current wading information of the vehicle is obtained, when a wade prompt function (WadeModeSts=0x1 Standby/0x2 Basic mode/0x3Professional mode) is opened, a corresponding interface reminder should be performed, and the priority of the interface reminder should be set as the highest, and the detail of the requirements are as follows:

After the wade prompt function is opened, a current gradient of the vehicle is measured according to the current wading depth and an internal gyroscope of the vehicle, and is displayed.

Different wading levels are obtained, different colors accompanied by a prompt tone are displayed on an interface of a display screen, as described in detail below:
  green represents a "safe area", without sound prompt;
  orange represents a "near-hazardous area" with 3 seconds of sound prompt;
  red represents a "hazardous area" with continuous sound prompt;
  Displaying of the wading depth and the wading levels should be correspondingly rendered.

When the wade detection module (WadeDetFunEna=0x2: Failure/Fault) has a fault, a fault alarm signal is sent, and relevant prompt information of "wade detection module is limited, please drive carefully" is displayed on the display screen.

The current wading depth information is displayed above center, the actual allowable maximum wading depth of the vehicle is displayed on the upper right, the HUT includes vehicle side information and vehicle front information, the scales above the vehicle displayed in the HUT represents the current gradient information, the red line represents danger information regarding the wading depth of the vehicle, water depth rendering is dynamically displayed according to the wading depth, and Open/Close in the down left represents Opening of the wading mode. Certainly, other information display method in other orientation and layout may also be possible, the information display method is not limited herein.

It can be seen from the above that, according to the present application, the current wading information of the vehicle is obtained, the wading information includes the wading depth, the preset wading level corresponding to the wading depth, and the current maximum allowable wading depth of the vehicle; the current state of the vehicle is obtained, wherein the current state of the vehicle includes the flameout parking state and the driving state. If the current state of the vehicle is the flameout parking state, the current wading information of the vehicle is sent to the terminal device of the user. If the current state of the vehicle is the driving state, the current wading information of the vehicle is displayed on the display screen of the vehicle. Thus, the user can obtain the wading state of the vehicle timely in any case.

Figure 3:
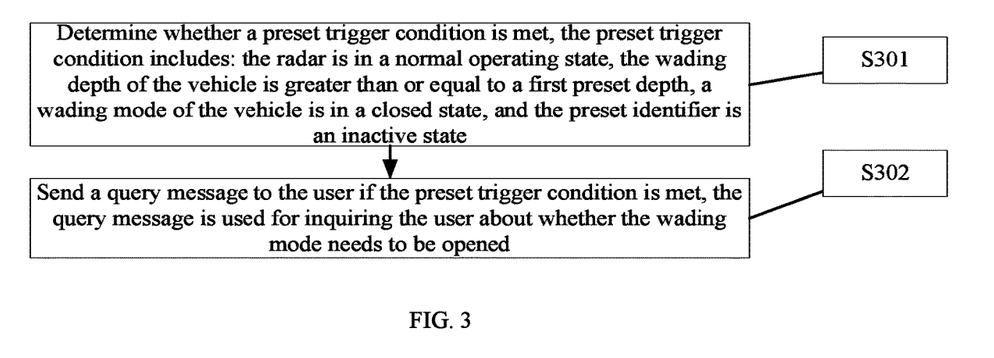
FIG. 3 is a flowchart illustrating an implementation of another method for prompting vehicle wading according to the embodiments of the present application.

FIG. 3 illustrates a flowchart of another method for prompting vehicle wading according to one embodiment of the present application. This method is applicable to vehicle wading prompt for a user when a vehicle is in a driving state. This method is described in detail below:

In a step of S301, whether a preset trigger condition is met is determined. The preset trigger condition is that a radar of the vehicle is in a normal operation state, a wading depth of the vehicle is greater than or equal to a first preset depth, a wading mode of the vehicle turned off, and a preset identifier Reset is in an inactive state.

When the wading depth of the vehicle of the driver reaches a certain depth, for example, when the wading depth reaches a dangerous depth, the driver should actively prompt whether the driver needs to open the wading mode for a certain period of time, to prevent the driver from entering a dangerous area due to insufficient driving experience. If the selection of the driver is don't opening the wading mode or the drives makes no selection, the prompt in the current ignition cycle is turned off, so as to avoid a complaint from the driver due to frequent prompting.

Whether the preset trigger condition is met is determined sequentially according to the following steps:

Whether the radar reaches a condition of enabling is determined first. If the condition of enabling is not reached, it indicates that the radar cannot operate normally, and no prompt is performed.

If the radar reaches the condition of enabling, that is, the radar is in the normal operating state, whether the current wading depth of the vehicle is greater than or equal to a first preset depth, such as 300 mm, is determined. If the current wading depth is less than 300 mm, no active prompt is performed.

Whether the wading mode is in a closed state is determined if the wading depth exceeds 300 mm, if the wading mode is not in the turned-off state, no active prompt is performed.

If the wading mode is in a closed state currently, whether the preset identifier Reset is in the active state is determined. If the preset identifier Reset is in the active state, no active prompt is performed.

If the preset identifier Reset is not in the activated state, that is, the preset identifier Reset is in the inactive state, the preset trigger condition is met. The preset trigger condition includes: the radar is in a normal operating state, the wading depth of the vehicle is greater than or equal to the first preset depth, the wading mode of the vehicle is in the turned-off state, and the preset identifier Reset is in the inactive state.

In a step of S302, if the preset trigger condition is met, a query message is sent to the user, the query message is used to inquire the user about whether the wading mode needs to be opened.

Optionally, the query message is displayed on the display screen of the vehicle, and a timer is triggered to be started and switch the timer from an inactive state to an activated state. If a response for opening the wading mode is received within the first preset time period, a wade switch request is sent, the wade switch request indicates that the wade switch is in an opened state, the inactive state of the preset identifier is maintained. If a user's response to the query message is not obtained within the first preset time period, or a user's response indicating that the wading mode is not opened is obtained within the first preset time period, the query message is deleted, the preset identifier Reset is switched from the inactive state to the activated state, and the Timer is switched from the activated state to the inactive state.

Optionally, the Timer is in the inactive state, that is, Timer=0, after the Timer is activated, Timer=1=the first preset time period. If the first preset time period is set to 8 s, the Timer=1=8 s.

In a requesting process of opening the wade switch:

At step 1, first, whether the state of the timer is changed is determined, if the state of the timer is not changed, the wade switch request (WadeSwReq_HUT) is maintained at its original state, and the preset identifier Reset is maintained in its original state;

At step 2, if a change of the state of the timer is determined in the step 1, whether the Timer is activated is continued to be determined. If the timer is not activated, the wade switch request (WadeSwReq_HUT) is maintained at its original state, the preset identifier Reset is maintained at its original state.

At step 3, if Timer=1 is determined in the step 2, whether the driver selects to open the wading mode according to the prompt is continued to be determined, that is, whether a response for opening the wading mode within the first preset time period is received is determined. If it is determined that the response for opening the wading mode is received within the first preset time period, the wade switch request (WadeSwReq_HUT=1) being in the open state is sent, and the preset identifier Reset is maintained at its original state;

At step 4, if it is determined that the driver does not select to open the wading mode in the step 3, that is, if a user's response to the query message is not obtained within the preset time period, or if a user's response indicating that the wading mode is not opened is obtained within the first preset time period, the wade switch request (WadeSwReq_HUT=1) being in the open state is sent, the preset identifier Reset is maintained at its original state, and whether a trigger time of the Timer exceeds 7 seconds (TBD) is continued to be determined. If the trigger time of the timer does not exceed 7 seconds, the preset identifier Reset is maintained at its original state, if the trigger time of the timer exceeds 7 seconds, information indicating Reset=1 and Timer=0 is sent.

Optionally, when Reset=1, the preset identifier Reset is in an activated state, when Reset=0, the preset identifier Reset is in an inactive state.

After Reset=1, in this ignition cycle, the preset trigger condition in the step S301 cannot be met again. Thus, the query message is no longer sent to the user in the current ignition cycle, and a situation that the user complains because that the user's attention on driving is disturbed due to frequent wade prompting is avoided.

Optionally, in order to ensure that the user looks over the wading state of the vehicle in time, the radar should maintain the operating state and send radar enabling information (the enabling information is responsible for input and output of control signal) continuously, regardless of which power state of the vehicle. However, when the radar is continuously in the operating state, certain loss to the electric quantity of the power supply of the whole vehicle is caused, the loss may be matched according to the actual vehicle type. Moreover, in order to avoid power consumption of the vehicle caused due to continuous operation of the radar, as an alternative, optimization is performed by performing a method described below:

A voltage of the vehicle is monitored, if the voltage of the vehicle is less than or equal to a preset voltage, the radar is turned off; and/or the radar is controlled to enter the operating state from a sleep state every second preset time period, after the operating state of the radar is maintained for third preset time period, measurement data is uploaded to a cloud, then, the radar enters the sleep state again. Wherein, the radar switches between the operating state and the sleep state according to a preset period. As an alternative, a wake-up instruction for waking up the radar is received from a cloud device, so that the radar enters the operating state from the sleep state. As yet another alternative, a wake-up instruction for waking up the radar is received from a terminal device of the user, so that the radar enters the operating state from the sleep state.

Optionally, the preset voltage is no less than a lowest voltage required for ignition of the vehicle.

For example, an operating period is set, and operating time is reduced: in a continuous power-off state, timing is performed once after the radar stops operation and enters the sleep state, the radar is waken up every 4 hours (the second preset time period is set to 4 hours), measurement time is at least 5 minutes (the third preset time period is 5 minutes), the radar uploads the measurement data to the cloud and continues to enter the sleep state. The wake-up state may be automatically completed by the radar, or alternatively, the radar is periodically awakened by the cloud. If the user looks over the current wading information by opening the APP, a radar monitoring function is actively activated.

It should be noted that the power-off state is a power-outage state, the values of the second preset time period and the third preset time period may be set according to actual requirement, and are not limited in the embodiments of the present application.

It can be seen from the above that, in the present application, by setting the preset triggering condition, the query message is sent to the user on the basis that the preset triggering condition is met, the request regarding whether opening the wading mode or not is submitted to the user, and the situation that the driver enters the dangerous area due to insufficient driving experience is avoided.

It should be understood that, the values of serial numbers of the steps in the aforesaid embodiments do not indicate an order of execution sequences of the steps. Instead, the execution sequences of the steps should be determined by functionalities and internal logic of the steps, and thus shouldn't be regarded as limitation to implementation processes of the embodiments of the present application.

The apparatus embodiments of the present application are described below. Regarding the details which are not described in detail, reference can be made to the corresponding method embodiments, the details of the apparatus embodiments which are not described in detail should be considered as being the same as the method embodiments, and have been definitely described in the specification.

Figure 4:
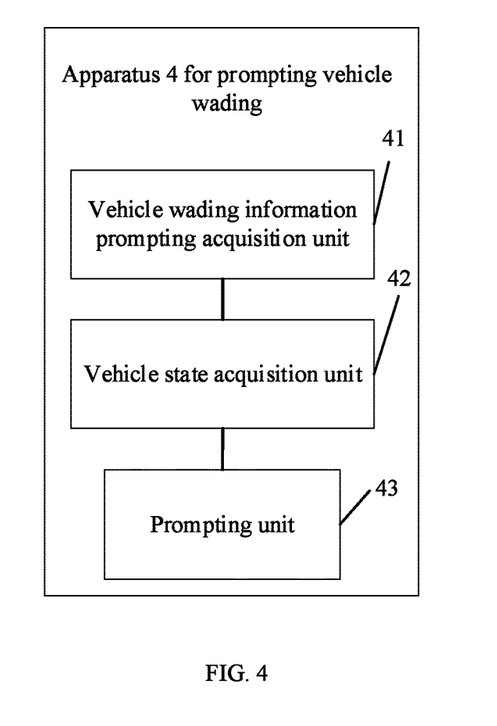
FIG. 4 is a schematic structural diagram of an apparatus for prompting vehicle wading according to the embodiments of the present application.

FIG. 4 illustrates a schematic structural diagram of an apparatus for prompting vehicle wading provided in the embodiments of the present application. For the convenience of illustration, the parts being relevant to the embodiments of the present application are merely illustrated, and the details of the parts are described below:

the apparatus 4 for prompting vehicle wading includes a vehicle wading information acquisition unit 41, a vehicle state acquisition unit 42 and a prompting unit 43.

The vehicle wading information acquisition unit 41 is configured to obtain current wading information of a vehicle, the wading information includes a wading depth, a preset wading level corresponding to the wading depth, and a current maximum allowable wading depth of the vehicle.

The vehicle state acquisition unit 42 is configured to obtain a current state of the vehicle, wherein the current state of the vehicle includes a flameout parking state and a driving state.

The prompting unit 43 is configured to send the current wading information of the vehicle to a terminal of a user if the current state of the vehicle is the flameout parking state; or display the current wading information of the vehicle on a display panel of the vehicle if the current state of the vehicle is the driving state.

Optionally, if the current state of the vehicle is the flameout parking state, the prompting unit 43 is configured to:
  send first prompt information to the terminal of the user if the wading depth is greater than or equal to a first preset depth, the first prompt information is used to prompt the user that the vehicle is in a dangerous state, and the first prompt information comprises trailer suggestion information.

Optionally, if the current state of the vehicle is the flameout parking state, the prompting unit 43 is configured to:
  send second prompt information to the terminal of the user if the wading depth is greater than or equal to a second preset depth and is less than a first preset depth. The second prompt information is used for prompting the user to perform a vehicle moving operation, the second prompt information is also used for requesting the user to indicate whether an automatic parking needs to be performed; receive an indication message sent by the user according to the second prompt information, and determine whether the automatic parking is performed according to the indication message.

Optionally, the prompting unit 43 is further configured to: send, if a radar cannot operate normally, third prompt information indicative of limited radar function to the terminal of the user, in order that the user detects the radar according to the third prompt information.

Optionally, if the current state of the vehicle is the driving state, the prompting unit 43 is further configured to:
obtain current gradient information of the vehicle;
display the current wading information of the vehicle and the current gradient information of the vehicle on the display panel of the vehicle, and perform a wading prompt through the display panel. The wading prompt corresponds to a preset wading level and the preset wading level corresponds to the wading depth.

If the current state of the vehicle is the driving state, the prompting unit 43 is further configured to:
determine whether a preset trigger condition is met, the preset trigger condition is that: the radar is in a normal operating state, the wading depth of the vehicle is greater than or equal to a first preset depth, a wading mode of the vehicle is in a closed state, and the preset identifier is in an inactive state;
send a query message to the user if the preset trigger condition is met; the query message is used for inquiring the user about whether the wading mode needs to be opened.

Optionally, the prompting unit 43 is further configured to:
display the query message on the display panel of the vehicle, and trigger a timer to be started, and switch the timer from an inactive state to an activated state;
send a wade switch request indicating that the wade switch is in an open state if a response for opening the wading mode is received within a first preset time period, the preset identifier is maintained at the inactive state;
close the query message, and switch the preset identifier from the inactive state to the activated state, and switch the timer from an activated state to an inactive state, if a response to the query message is not obtained from the user within the first preset time period, or if a response indicating that the wading mode is not opened is obtained from the user within the first preset time period.

Optionally, if the current state of the vehicle is the flameout parking state, the vehicle state acquisition unit 42 is further configured to:
monitor a voltage of the vehicle, and turn off the radar if the voltage of the vehicle is less than or equal to a preset voltage;
and/or, control the radar to enter an operating state from a sleep state every second preset time period, maintain the operating state of the radar for the third preset time period, and then upload measurement data to a cloud and enter the sleep state again, wherein the radar switches between the sleep state and the operating state according to a preset period; or receive a wake-up instruction for waking up the radio from a cloud device, in order to enable the radar to enter the operating state from the sleep state, or receive a wake-up instruction for waking up the radar from the terminal of the user, in order to enable the radar to enter the operating state from the sleep state.

It can be seen from the above that, according to the present application, the current wading information of the vehicle is obtained, the wading information includes the wading depth, the preset wading level corresponding to the wading depth, and the current maximum allowable wading depth of the vehicle; the current state of the vehicle is obtained, wherein the current state of the vehicle includes the flameout parking state and the driving state. If the current state of the vehicle is the flameout parking state, the current wading information of the vehicle is sent to the terminal of the user. If the current state of the vehicle is the driving state, the current wading information of the vehicle is displayed on the display panel of the vehicle. Thus, the user can obtain the wading state of the vehicle timely in any case.

Figure 5:
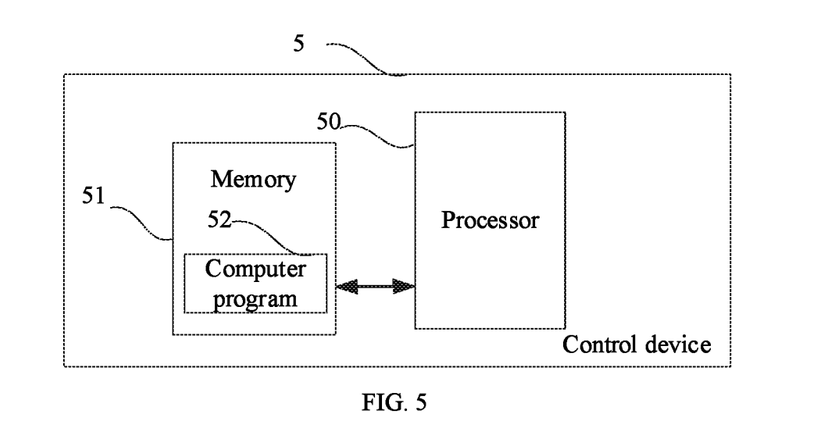
FIG. 5 is a schematic diagram of a control device according to the embodiments of the present application.

FIG. 5 illustrates a schematic diagram of a control device provided by one embodiment of the present application. As shown in FIG. 5, the control device 5 in this embodiment includes: a processor 50, a memory 51 and a computer program 52 stored in the memory 51 and executable by the processor 50. The processor 50 is configured to, when executing the computer program 52, implement the steps (e.g., the steps 101-104 shown in FIG. 1) in the embodiments of the various methods for prompting vehicle wading. As an alternative, the processor 50 is configured to, when executing the computer program 52, implement the functions of the various modules/units in the various apparatus embodiments, such as the functions of the modules/units 41 shown in FIG. 4.

Optionally, a vehicle is further provided in one embodiment of the present application. The vehicle includes the control device shown in FIG. 5.

For example, the computer program 52 may be divided into one or a plurality of modules/units, the one or plurality of modules/units are stored in the memory 51, and are executed by the processor 50 so as to implement the present application. The one or plurality of modules/units may be a series of computer program instruction segments that can accomplish particular functionalities, these instruction segments are used for describing an executive process of the computer program 52 in the control device 5. For example, the computer program 52 may be divided into modules/units 41-43 shown in FIG. 4.

The control device 5 may include but is not limited to: the processor 50 and the memory 51. The person of ordinary skill in the art may understand that, FIG. 5 is merely an example of the control device 5 and is not constituted as limitation to the control device 5, more or less components than the components shown in FIG. 5 may be included, or some components or different components may be combined. For example, the control device may also include an input and output device, a network access device, a bus, etc.

The processor 50 may be central processing unit (CPU), and may also be other general purpose processor, digital signal processor (DSP), application specific integrated circuit (ASIC), field-programmable gate array (FGPA), or some other programmable logic devices, discrete gate or transistor logic device, discrete hardware component, etc. The general purpose processor may be a microprocessor, as an alternative, the processor may also be any conventional processor, or the like.

The memory 51 may be an internal storage unit of the control device 5, such as a hard disk or a memory of the control device 5. The memory 51 may also be an external storage device of the control device 5, such as a plug-in hard disk, a SMC (Smart Media Card), a SD (Secure Digital) card, a FC (Flash Card) equipped on the control device 5. Furthermore, the memory 51 may not only include the internal storage unit of the control device 5, but also include the external memory of the control device 5. The memory 51 is configured to store the computer program, and other procedures and data needed by the control device 5. The memory 51 can also be configured to store data that has been output or being ready to be output temporarily.

The person of ordinary skill in the art may understand clearly that, for the convenience of description and for conciseness, the dividing of the aforesaid various functional units and functional modules is merely described according to examples, in an actual application, the aforesaid functions may be assigned to different functional units and functional modules to be accomplished, that is, an inner structure of the device is divided into different functional units or modules, so that the whole or a part of functionalities described above can be accomplished. The various functional units and modules in the embodiments may be integrated into a processing unit, or each of the units exists independently and physically, or two or more than two of the units are integrated into a single unit. The aforesaid integrated unit may either by actualized in the form of hardware or in the form of software functional units. In addition, specific names of the various functional units and modules are only used to distinguish from each other conveniently, rather than being intended to limit the protection scope of the present application. Regarding the specific working process of the units and modules in the aforesaid system, reference may be made to a corresponding process in the aforesaid method embodiments, this specific operation process is not repeatedly described herein.

In the aforesaid embodiments, the descriptions of the various embodiments are emphasized respectively, regarding a part of one embodiment which has not been described or disclosed in detail, reference can be made to relevant descriptions in other embodiments.

The person of ordinary skill in the art may understand that, the elements and algorithm steps of each of the examples described in connection with the embodiments disclosed herein may be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present application.

It should be understood that, in the embodiments of the present application, the disclosed device/control device and method could be implemented in other ways. For example, the device/control device embodiments described above are merely illustrative; for example, the division of the modules or units is only a logical function division, and other division manner could be used in the actual implementation, for example, multiple units or components could be combined or integrated into another system, or some features may be ignored, or are not performed. In another aspect, the coupling or direct coupling or communicating connection shown or discussed could be an indirect coupling or a communicating connection through some interfaces, devices or units, and the coupling or direct coupling or communicating connection could be electrical, mechanical, or in other form.

The units described as separate components can be or cannot be physically separate, the components shown as units can be or cannot be physical units, the components may be located in one place, or be distributed onto multiple network elements. A part or a whole of the elements can be selected to achieve the objective of the technical solution of this embodiment according to the actual requirement.

In addition, the various functional units in each of the embodiments of the present application may be integrated into a single processing unit, or exist individually and physically, or two or more than two units are integrated into a single unit. The aforesaid integrated unit can either be achieved by hardware, or be achieved in the form of software functional units.

When the integrated module/unit is achieved in the form of software functional unit, and is sold or used as an independent product, the integrated module/unit may be stored in a computer readable storage medium. Based on this understanding, a whole or part of flow process for implementing the method in the embodiments of the present application can also be accomplished in the manner of using computer program to instruct relevant hardware. When the computer program is executed by the processor, the steps in the various method embodiments for prompting vehicle wading described above may be implemented. Wherein, the computer program includes computer program codes, which may be in the form of source code, object code, executable documents or some intermediate form, etc. The computer readable medium can include: any physical equipment or device that can carry the computer program codes, recording medium, USB flash disk, mobile hard disk, hard disk, optical disk, computer memory, ROM (Read-Only Memory), RAM (Random Access Memory).

The foregoing embodiments are only intended to explain the technical solutions of the present application, rather than limiting the technical solutions of the present application. Although the present application has been described in detail with reference to these embodiments, a person of ordinary skilled in the art should understand that, the technical solutions disclosed in the embodiments may also be amended, some technical features in the technical solutions may also be equivalently replaced. The amendments or the equivalent replacements don't cause the essence of the corresponding technical solutions to be deviated from the spirit and the scope of the technical solutions in the various embodiments of the present application, and thus should all be included in the protection scope of the present application.

The invention claimed is:

1. A method for prompting vehicle wading, wherein the method comprises:
    obtaining current wading information of a vehicle, the wading information comprises a wading depth, a preset wading level corresponding to the wading depth, and a current maximum allowable wading depth of the vehicle;
    obtaining a current state of the vehicle, wherein the current state of the vehicle comprises a flameout parking state and a driving state;
    sending the current wading information of the vehicle to a terminal device of a user if the current state of the vehicle is the flameout parking state; and
    displaying the current wading information of the vehicle on a display screen of the vehicle if the current state of the vehicle is the driving state;
    wherein if the current state of the vehicle is the driving state, the method further comprises:
    determining whether a preset trigger condition is met, wherein the preset trigger condition is that comprises: a radar of the vehicle is in a normal operating state, the wading depth of the vehicle is greater than or equal to a first preset depth, a wading mode of the vehicle is in a closed state, and a preset identifier is in an inactive state;
    sending a query message to the user if the preset trigger condition is met, wherein the query message is used for inquiring the user about whether the wading mode of the vehicle needs to be opened;

displaying the query message on the display screen of the vehicle, triggering a timer to be started, and switching the timer from an inactive state to an activated state; and sending a wade switch request indicating that a wade switch is in an open state if a response for opening the wading mode of the vehicle is received within a first preset time period, the preset identifier is maintained at the inactive state; or closing the query message, switching the preset identifier from the inactive state to the activated state and switching the timer from an activated state to an inactive state, if a response to the query message is not obtained from the user within the first preset time period, or if a response indicating that the wading mode of the vehicle is not opened is obtained from the user within the first preset time period.

2. The method for prompting vehicle wading according to claim 1, wherein if the current state of the vehicle is the flameout parking state, the method further comprises:

sending first prompt information to the terminal device of the user if the wading depth is greater than or equal to a first preset depth, wherein the first prompt information is used to prompt the user that the vehicle is in a dangerous state, and the first prompt information comprises trailer suggestion information.

3. The method for prompting vehicle wading according to claim 1, wherein if the current state of the vehicle is the flameout parking state, the method further comprises:

sending second prompt information to the terminal device of the user if the wading depth is greater than or equal to a second preset depth and is less than a first preset depth, wherein the second prompt information is used to prompt the user to perform a vehicle moving operation, the second prompt information is also used to request the user to indicate whether an automatic parking needs to be performed; and receiving an indication message sent by the terminal device of the user according to the second prompt information, and determining whether the automatic parking is performed according to the indication message.

4. The method for prompting vehicle wading according to claim 1, wherein if the current state of the vehicle is the flameout parking state, the method further comprises:

sending, if the radar of the vehicle cannot operate normally, third prompt information indicative of limited radar function to the terminal device of the user, in order that the user detects the limited radar function according to the third prompt information.

5. The method for prompting vehicle wading according to claim 1, wherein if the current state of the vehicle is the driving state, the method further comprises:

obtaining current gradient information of the vehicle; and displaying the current wading information of the vehicle and the current gradient information of the vehicle on the display screen of the vehicle, and performing a wading prompt through the display screen, wherein the wading prompt corresponds to the preset wading level and the preset wading level corresponds to the wading depth.

6. The method for prompting vehicle wading according to claim 1, wherein if the current state of the vehicle is the flameout parking state, the method further comprises:

monitoring a voltage of the vehicle, and turning off the radar if the voltage of the vehicle is less than or equal to a preset voltage; and/or controlling the radar to enter an operating state from a sleep state every second preset time period, maintaining the operating state of the radar for a third preset time period, and then uploading measurement data to a cloud device and entering the sleep state again, wherein the radar switches between the sleep state and the operating state according to a preset period; or receiving a wake-up instruction for waking up a radio from the cloud device, in order to enable the radar to enter the operating state from the sleep state, or receiving a wake-up instruction for waking up the radar from the terminal device of the user, in order to enable the radar to enter the operating state from the sleep state.

7. A non-transitory computer-readable storage medium, which stores a computer program, that, when executed by a processor of a control device, causes the processor of the control device to implement steps of the method according to claim 1.

8. A control device, comprising a memory, a processor and a computer program stored in the memory and executable by the processor, wherein the processor is configured to, obtain current wading information of a vehicle, wherein the wading information comprises a wading depth, a preset wading level corresponding to the wading depth, and a current maximum allowable wading depth of the vehicle;

obtain a current state of the vehicle, wherein the current state of the vehicle comprises a flameout parking state and a driving state;

send the current wading information of the vehicle to a terminal device of a user if the current state of the vehicle is the flameout parking state; and display the current wading information of the vehicle on a display screen of the vehicle if the current state of the vehicle is the driving state;

wherein if the current state of the vehicle is the driving state, the processor is further configured to:

determine whether a preset trigger condition is met, wherein the preset trigger condition is that comprises: a radar of the vehicle is in a normal operating state, the wading depth of the vehicle is greater than or equal to a first preset depth, a wading mode of the vehicle is in a closed state, and a preset identifier is in an inactive state;

send a query message to the user if the preset trigger condition is met, wherein the query message is used for inquiring the user about whether the wading mode of the vehicle needs to be opened;

display the query message on the display screen of the vehicle, triggering a timer to be started, and switching the timer from an inactive state to an activated state; and send a wade switch request indicating that a wade switch is in an open state if a response for opening the wading mode of the vehicle is received within a first preset time period, the preset identifier is maintained at the inactive state; or close the query message, switching the preset identifier from the inactive state to the activated state and switching the timer from an activated state to an inactive state, if a response to the query message is not obtained from the user within the first preset time period, or if a response indicating that the wading mode of the vehicle is not opened is obtained from the user within the first preset time period.

9. A vehicle, wherein the vehicle comprises the control device according to claim 8.

10. The control device according to claim 8, wherein if the current state of the vehicle is the flameout parking state, the processor is further configured to:
    send first prompt information to the terminal device of the user if the wading depth is greater than or equal to a first preset depth, wherein the first prompt information is used to prompt the user that the vehicle is in a dangerous state, and the first prompt information comprises trailer suggestion information.

11. The control device according to claim 8, wherein if the current state of the vehicle is the flameout parking state, the processor is further configured to:
    send second prompt information to the terminal device of the user if the wading depth is greater than or equal to a second preset depth and is less than a first preset depth, wherein the second prompt information is used to prompt the user to perform a vehicle moving operation, the second prompt information is also used to request the user to indicate whether an automatic parking needs to be performed; and
    receive an indication message sent by the terminal device of the user according to the second prompt information, and determining whether the automatic parking is performed according to the indication message.

12. The control device according to claim 8, wherein if the current state of the vehicle is the flameout parking state, the processor is further configured to:
    send, if the radar of the vehicle cannot operate normally, third prompt information indicative of limited radar function to the terminal device of the user, in order that the user detects the limited radar function according to the third prompt information.

13. The control device according to claim 8, wherein if the current state of the vehicle is the driving state, the processor is further configured to:
    obtain current gradient information of the vehicle; and
    display the current wading information of the vehicle and the current gradient information of the vehicle on the display screen of the vehicle, and perform a wading prompt through the display screen, wherein the wading prompt corresponds to the preset wading level and the preset wading level corresponds to the wading depth.

14. The control device according to claim 8, wherein if the current state of the vehicle is the flameout parking state, the processor is further configured to:
    monitor a voltage of the vehicle, and turn off the radar if the voltage of the vehicle is less than or equal to a preset voltage; and/or
    control the radar to enter an operating state from a sleep state every second preset time period, maintain the operating state of the radar for a third preset time period, and then upload measurement data to a cloud device and enter the sleep state again; wherein the radar switches between the sleep state and the operating state according to a preset period; or receive a wake-up instruction for waking up a radio from the cloud device, in order to enable the radar to enter the operating state from the sleep state, or receive a wake-up instruction for waking up the radar from the terminal device of the user, in order to enable the radar to enter the operating state from the sleep state.

* * * * *